United States Patent [19]
Rickman

[11] Patent Number: 5,614,659
[45] Date of Patent: Mar. 25, 1997

[54] PORE-AIR PRESSURE MEASUREMENT DEVICE FOR USE IN HIGH SHOCK ENVIRONMENTS

[75] Inventor: Denis D. Rickman, Clinton, Miss.

[73] Assignee: The United States of America as represented by the Secretary of the Army, Washington, D.C.

[21] Appl. No.: 442,523

[22] Filed: May 16, 1995

[51] Int. Cl.$^6$ ................................................. G01L 19/14
[52] U.S. Cl. ........................... 73/35.16; 73/706; 73/784
[58] Field of Search ................................ 73/35.16, 706, 73/756, 784

[56] References Cited

U.S. PATENT DOCUMENTS

| | | | |
|---|---|---|---|
| 2,548,947 | 4/1951 | Clewell | 73/35.16 |
| 2,747,407 | 5/1956 | Knoll | 73/706 |
| 3,374,664 | 3/1968 | Lefelholz et al. | 73/706 |
| 4,218,925 | 8/1980 | DiDomizio, Jr. | 73/706 |
| 4,252,126 | 2/1981 | Mandl | 73/706 |
| 4,367,651 | 1/1983 | Cameron et al. | 73/706 |
| 4,517,842 | 5/1985 | Twomey et al. | 73/706 |
| 4,524,626 | 6/1985 | Pabst et al. | 73/784 |
| 4,535,633 | 8/1985 | Schiess et al. | 73/706 |
| 4,662,226 | 5/1987 | Wang | 73/784 |
| 4,881,400 | 11/1989 | Goodman et al. | 73/35.14 |
| 5,144,882 | 9/1992 | Pelkey et al. | 73/706 |

*Primary Examiner*—John E. Chapman
*Attorney, Agent, or Firm*—Luther A. Marsh

[57] ABSTRACT

A device for measuring soil pore-air pressure in a high shock environment is characterized by a shock resistant housing containing a plurality of pressure sensing ports with sintered metal filters mounted therein which filter fine soil particles, withstand high pressure shock, and permit high air flow. When the device is installed in the ground and an explosive is detonated nearby, soil particles are filtered from the air blast by the sintered metal filters, thereby enabling the device to provide accurate pore-air pressure measurements.

3 Claims, 2 Drawing Sheets

PORE-AIR PRESSURE MEASUREMENT DEVICE FOR USE IN HIGH SHOCK ENVIRONMENTS

BACKGROUND OF THE INVENTION

The present invention relates to a pressure measurement device and, in particular, to a pressure measurement device for accurately measuring pore-air pressure produced by the detonation of explosives.

The Defense Nuclear Agency (DNA) has sponsored an ongoing effort to evaluate the survivability of structures under loading conditions produced by nuclear detonations. To this end, high-explosive charges are typically used to simulate the nuclear loading phenomenon on test structures. An important aspect of the simulation is the ground motion produced by the charge detonation. In order to properly position test structures which are sensitive to ground motion, it is necessary to accurately predict the ground motion field produced by the explosive charge.

Attempts to calculate the ground motion produced by large-scale explosive charges have been somewhat successful at duplicating the early-time motions (i.e., those occurring during the positive air blast loading phase). However, these calculations have not accurately modeled late-time motions. The material properties thought to contribute most to late-time behavior are shock degradation of the cohesive strength of cemented soils, and the ability of air trapped within the soil, known as pore-air, to transmit pressure when compressed. Pore-air effects are of greater importance near the ground surface, where air blast pressures penetrate into the soil. Information on the soil pore-air pressure history is essential for improvement of calculated models for late-time ground motion near the ground surface.

Pore-air pressure measurements are complicated by the presence of high shock transients, and the fact that pore-air pressure changes during shock loading are relatively small. No method is currently available to accurately and consistently measure pore-air pressure.

The key to obtaining an accurate and reliable measurement of the pore-air pressure in soil is to isolate the pressure sensing element from the stresses transmitted through the soil particles while allowing the pore-air pressure to flow to the sensor. This can be accomplished by placing an air permeable filter in front of the pressure sensor. This filter must have sufficiently small pore size as to effectively block out the finest soil particles while allowing air to flow through at the highest possible rate. In addition, the filter must be corrosion resistant and strong enough not to fail under significant loads.

BRIEF DESCRIPTION OF THE PRIOR ART

In order to measure the pressure of liquids and gases beneath ground level, various devices have been employed which are known in the patented prior art. U.S. Pat. No. 3,374,664 to Lefelhocz et al, for example, discloses a device for measuring pore-fluid pressures in earthen formations. More particularly, a porous tube piezometer having a flexible, corrosion resistant, fluid permeable screen cover is disclosed. In operation, the device is placed at the desired depth and pressure is indicated by the height of water in the riser tube which extends to the surface of the earth.

The Twomey et al U.S. Pat. No. 4,517,842 discloses a diaphragm-type fluid pressure transducer for measurement of pore pressure in landfills, natural alluvial sediments and similar geological formations. With this device, pore pressure is measured by balancing the fluid pressure to be measured acting on one face of the diaphragm with a control fluid acting against the opposite face of the diaphragm. At the point where the pressures on the two sides of the diaphragm are balanced, sensors measure the pressure of the control fluid thus indicating the pressure at the point of installation.

The Knoll U.S. Pat. No. 2,747,407 discloses an apparatus for measuring the pressure of a fluid located within a body of solid material, such as the pressure of a subterranean liquid or gas. This apparatus includes a porous sintered metal filter mounted so as to protect a pressure sensing membrane located within the apparatus casing. The sintered metal filter is conically shaped to aid in driving the apparatus into the ground and contains pores smaller than the smallest particles of earth so that the filter cannot become clogged.

Various devices have also been employed to measure pressure resulting from the detonation of explosives. The Clewell U.S. Pat. No. 2,548,947, for example, discloses a non-directional pressure responsive device which produces signals whose magnitudes are representative of the magnitude of the pressure changes resulting from the explosion of a charge. More specifically, the device includes a hollow sphere, preferably formed of steel, filled with carbon granules with an electrode centrally disposed therein. When an explosive is detonated, the sphere is deformed, thereby compressing the carbon granules and producing a change in current flowing through them. This change in current flow indicates the magnitude of the explosive blast.

U.S. Pat. No. 5,144,842 to Pelkey et al discloses a pressure transducer protection apparatus utilizing a flexible shock-absorbent material and a metal disk to protect the sensing element of a pressure transducer. In this manner, measurement of air loads plus dust loads in transient dusty flow behind a simulated nuclear air blast can be made.

None of the prior devices, however, are capable of accurately and repeatedly measuring pore-air pressure in the vicinity of an explosive blast. The present invention was developed to overcome these and other drawbacks by providing a pore-air pressure measurement device including a shock resistant housing having a plurality of sensing ports, a filter mounted in each port which can withstand high pressure explosive shocks and filter out fine soil particles while permitting high air flow, and sensors mounted within the housing for measuring the pressure at each of the ports.

SUMMARY OF THE INVENTION

Accordingly, it is a primary object of the present invention to provide a device for accurately and consistently measuring soil pore-air pressure in a high-shock environment. More particularly, it is an object of the present invention to provide a pore-air pressure measurement device including a shock resistant housing containing a plurality of pressure sensing ports, a filter mounted within each of the ports for filtering soil particles therefrom, and a sensor mounted within the housing for sensing air pressure at each of the ports. When the device is installed below ground level and an explosive is detonated in the vicinity of the device, soil particles are filtered from the airblast by the filter, thereby enabling the device to provide accurate pore-air pressure measurement.

It is a further object of the present invention to provide a pore-air pressure measurement device having three sensing ports arranged orthogonally.

A yet further object of the present invention is to provide a pore-air pressure measurement device having sintered metal filters which filter fine soil particles, withstand high pressure shock, and permit high air flow.

Another object of the present invention is to provide a pore-air pressure measurement device having protective tubing connected with the housing and extending through the air blast zone to protect sensor signal cables from the air blast.

BRIEF DESCRIPTION OF THE DRAWINGS

Other objects and advantages of the invention will become apparent from a study of the following specification when viewed in light of the accompanying drawings, in which.

DETAILED DESCRIPTION

Figure 1:
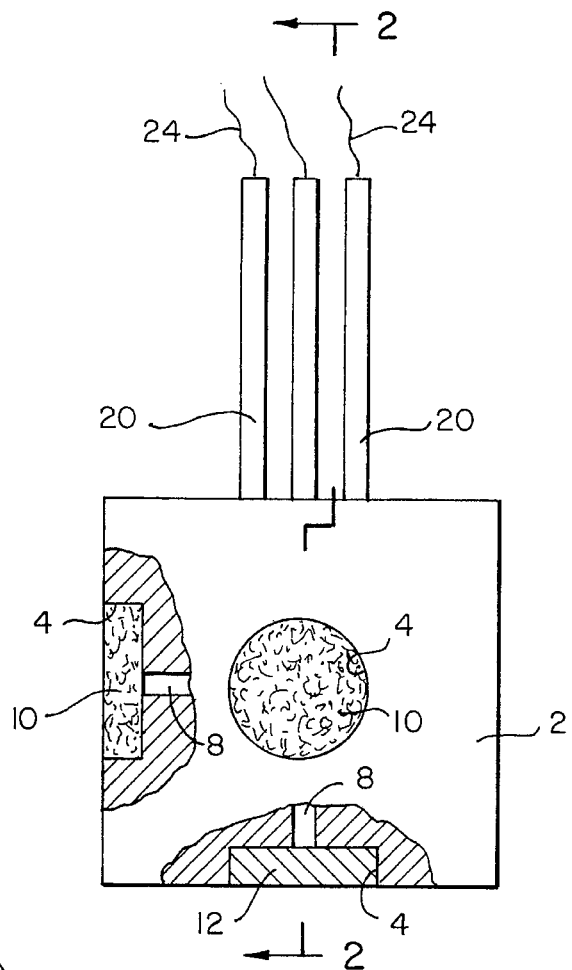
FIG. 1 is a front partial sectional view of the pore-air pressure measurement device according to the invention illustrating the preferred locations of the pressure sensing ports.
Figure 2:
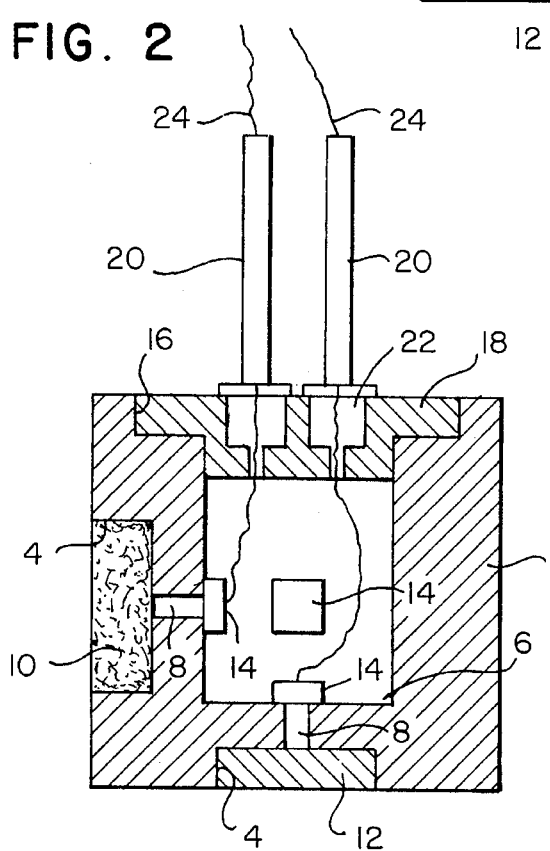
FIG. 2 is a sectional view taken along line 2—2 of FIG. 1.
Figure 3:
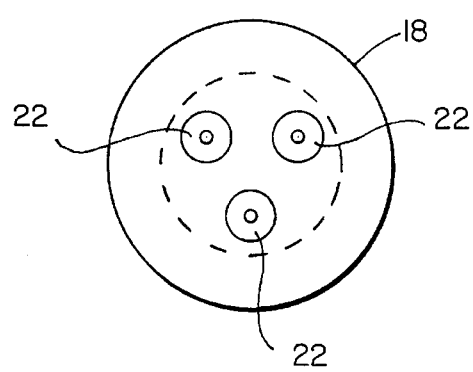
FIG. 3 is a top plan view of the tubing adapter of the invention.
Figure 4:
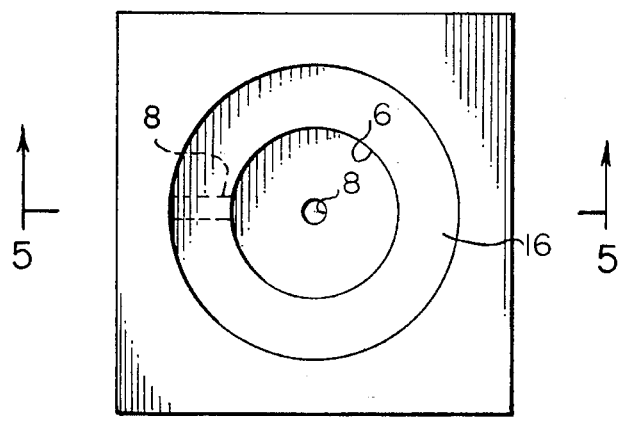
FIG. 4 is a top plan view of the housing.
Figure 5:
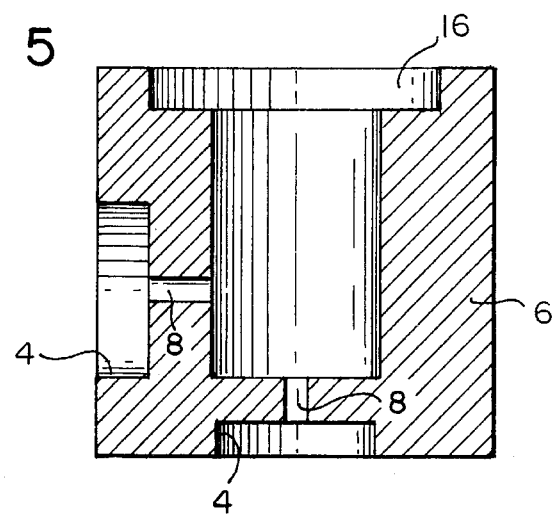
FIG. 5 is a sectional side view of the housing taken along line 5—5 of FIG. 4.
Figure 6:
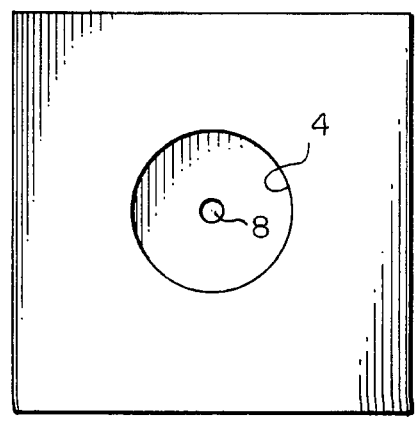
FIG. 6 is a bottom view of the housing.

Referring first to FIGS. 1 and 2, there is shown a housing 2 having a plurality of pressure sensing ports 4 arranged in the side and bottom walls thereof. The housing contains a central chamber 6 and a plurality of conduits 8 affording communication between the ports 4 and the chamber 6, respectively, as shown in FIGS. 4–6. A filter device 10 is arranged within at least one of the ports and a plug 12 is arranged within another of the ports.

The filter device 10 has sufficiently small pore size to effectively block out the finest soil particles, while allowing air to flow therethrough at the highest possible rate. The filter material is also strong enough to withstand failure under significant loads and is corrosion resistant. To achieve these characteristics, a sintered metal filter made of a corrosion resistant metal such as 316L stainless steel is used. Moreover, to achieve the optimal combination of effectively blocking out soil particles and maximum strength to withstand the airblast-driven shock, a 10-micron filtration grade for the sintered metal filter is used. By constructing the sintered metal filter with a 10-micron filtration grade from 316L stainless steel, a filter capable of providing adequate protection against shear failure for applied soil stresses up to 10,000 pounds per square inch (psi) is achieved.

Pressure sensors 14 such as commercially available airblast pressure gages are mounted in the chamber 6 adjacent each conduit as shown in FIG. 2. Accordingly, pressure from an airblast in the vicinity of the housing is communicated to each sensor via the respective ports and conduits of the housing.

In its upper surface, the housing contains a bore 16 for receiving an adaptor 18 having protective tubing 20 connected therewith. The adaptor contains openings 22 for receiving signal cables 24 from the sensors 14. The signal cables pass through the adaptor and the protective tubing 20 for connection with a conventional data recording and/or display device (not shown) to record and display the pressure measured by the sensors following an airblast.

FIG. 1 illustrates the preferred number and arrangement of the pressure sensing ports 4. In this embodiment, three ports are arranged orthogonally so as to face in mutually perpendicular directions. For most applications, two active measurements would be made; one as a primary pore-air pressure measurement, and the other as a check of the directional variability of the pore-air pressure. The measured pore-air pressure should be directionally insensitive after the device is engulfed by the initial air blast-driven shock. Any differences between the two measurements after shock passage is a measure of gage inaccuracy. The third measurement port is capped with the solid plug 12 instead of a filter to prevent air pressure from reaching the sensor for that port. The plugged port thus defines a null channel and the measurements from the sensor therefor indicate the noise (mechanical or electrical) inherent in the measurement and recording systems.

To obtain a pore-air measurement, the device is installed at the desired measurement depth with one of the pressure sensor ports preferably facing vertically and the remaining two facing horizontally as shown in FIGS. 1 and 2. Once the device is leveled, the soil is hand packed, thereby insuring that no large voids which can introduce error into the measurement are present.

The device is best suited for dry soils since in wet soils, water may collect in the filters and/or in the area in front of the sensors. This may lead to erroneous or inaccurate pore-air pressure measurements.

While in accordance with the provisions of the patent statute the preferred forms and embodiments have been illustrated and described, it will be apparent to those of ordinary skill in the art that various changes and modification may be made without deviating from the inventive concept set forth above.

What is claimed is:

1. A pore air-pressure sensing device comprising:
   (a) a generally rectangular housing containing a plurality of pressure sensing ports in external surfaces thereof, a bore, and an internal chamber connecting said ports with said bore;
   (b) means mounted within each of said ports for filtering soil particles therefrom;
   (c) means mounted within said chamber for sensing air pressure at each of said ports, whereby when the device is installed beneath ground level and an explosive is detonated in the vicinity of said device, soil particles are filtered from the air blast by said filter means, thereby enabling the device to provide accurate pore-air pressure measurements;
   (d) means connected with said sensing means for indicating said air pressure;
   (e) wherein said filter means consist of sintered metal comprising stainless steel and having a 10-micron filtration grade;
   (f) wherein said filter means are capable of withstanding applied soil stresses up to 10,000 psi; and
   (g) wherein said sensing means include a pressure gage for each port.

2. A pore-air pressure sensing device as defined in claim 1, and further comprising signal cables for connecting said indicating means with said pressure gages and wherein said ports comprise three ports arranged orthogonally.

3. A pore-air pressure sensing device as defined in claim 2, wherein one of said ports contains a plug, whereby air pressure is prevented from reaching the pressure gage corresponding to said one port, thereby to provide a null channel.

* * * * *